Oct. 7, 1930.                J. W. SHERA                 1,777,772
                             DIE MECHANISM
                         Filed April 11, 1929        2 Sheets-Sheet 1
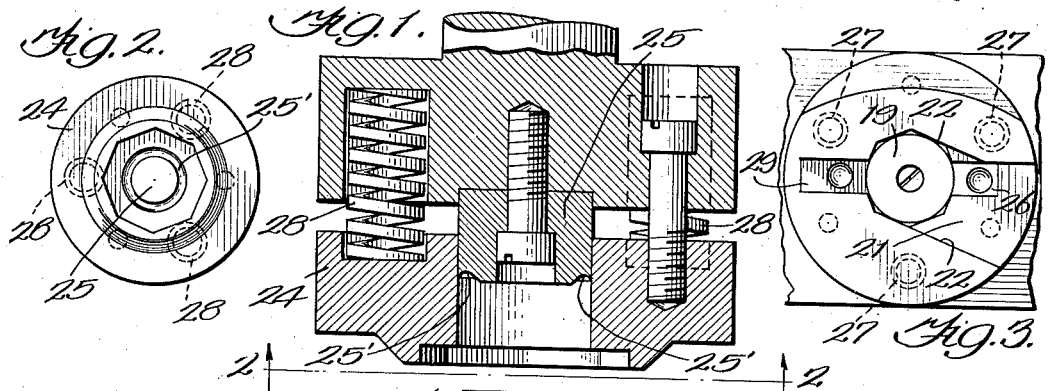
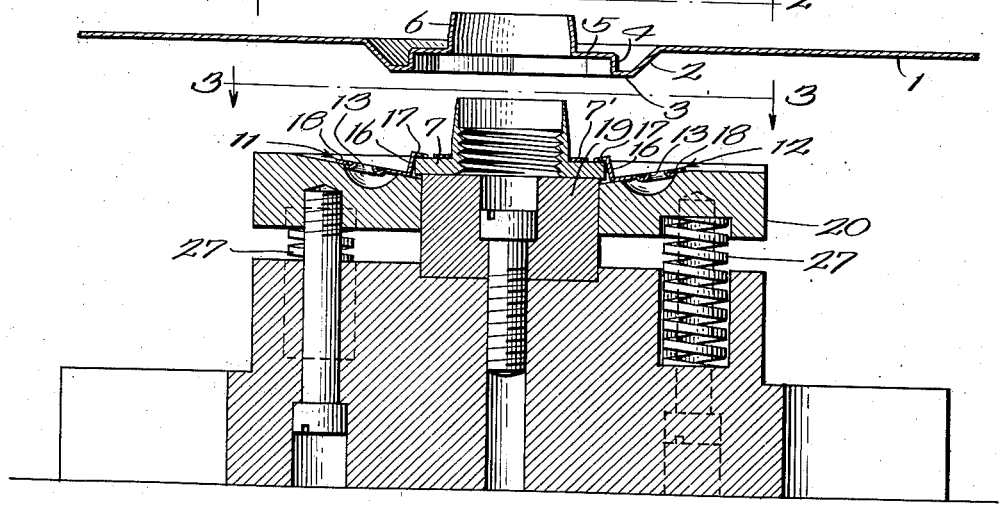
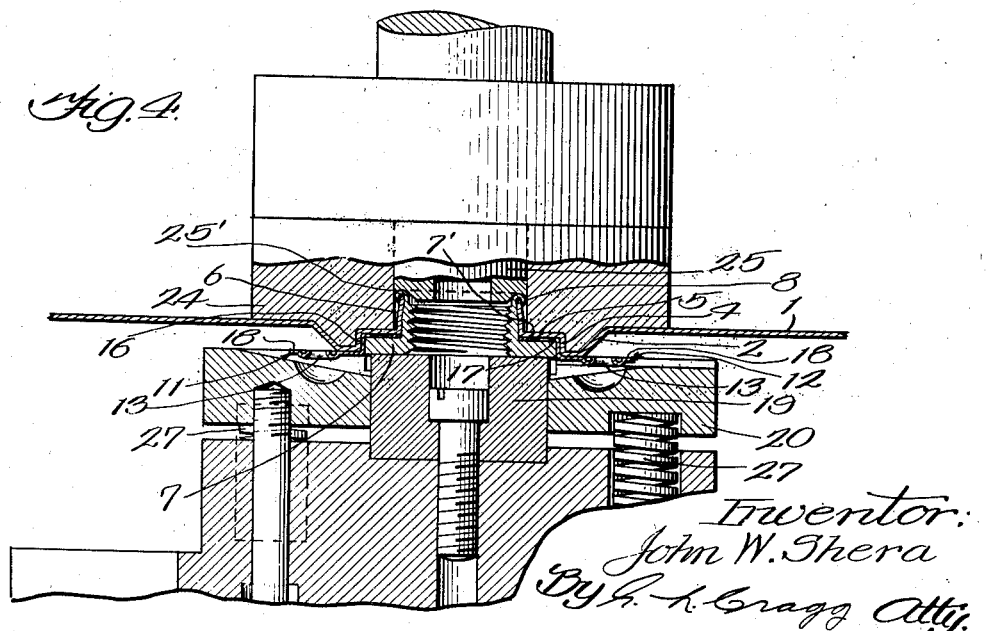
Inventor:
John W. Shera
By L. L. Cragg Atty.

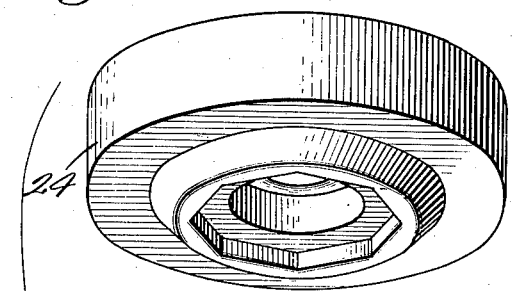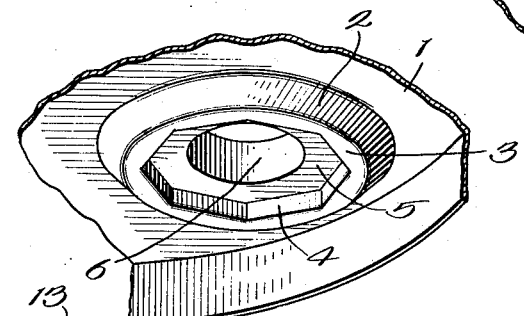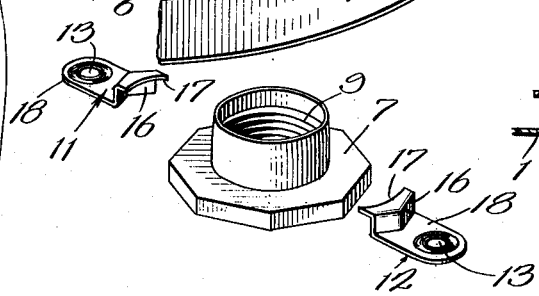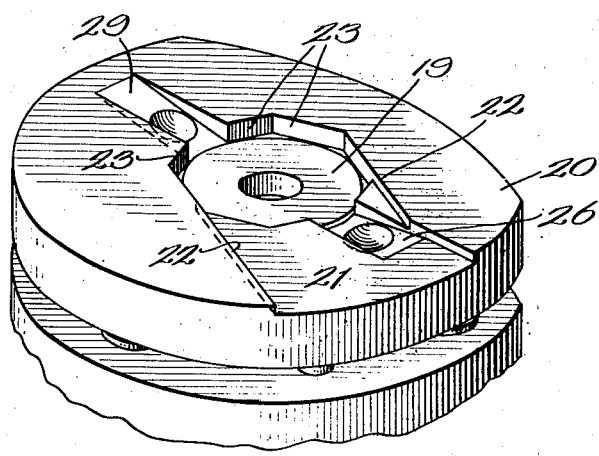

Patented Oct. 7, 1930

1,777,772

UNITED STATES PATENT OFFICE

JOHN W. SHERA, OF OAK PARK, ILLINOIS, ASSIGNOR TO AMERICAN FLANGE & MANUFACTURING CO., OF CHICAGO, ILLINOIS, A CORPORATION OF ILLINOIS

DIE MECHANISM

Application filed April 11, 1929. Serial No. 354,342.

My invention relates to die mechanism which is employed for effecting assembly between interiorly threaded bushings and metallic sheets, such as walls of metallic containers, having openings with which the bores of the bushings are to be held in alignment. The flanges of the bushings, which are to be thus assembled, are normal to the bushing axes and usually have their peripheries of polygonal formation to provide parts that are unequally spaced from the bushing axes and which parts engage holding portions upon the container walls to prevent the bushings from being turned. Hitherto the bushings have been adjusted by hand to bring their polygonal flanges into proper relation with correspondingly shaped die portions and the pockets in the container walls that are to receive the flanges as a consequence of the operation of the mechanism. By means of my invention, such positioning of the bushing flanges is automatically accomplished upon the mere insertion of the bushings into the die mechanism. The assembly of sealing elements, such as tags, between the bushing flanges and the container walls is also facilitated.

The die mechanism of my invention is inclusive of an anvil member upon which the flange of a bushing is to be seated, a guiding member within which the anvil member is disposed and which guiding member is formed with a lateral gateway having side walls spaced apart coextensively with two opposite sides of the bushing flange to insure the location of the flange upon the anvil member in a predetermined position, said gateway terminating in a formation, at its inner end, which defines a predetermined position for the bushing flange with respect to the anvil member. I also desirably provide a finishing member in which a substantially cylindrical rim formed upon and projecting angularly from a metallic container wall is snugly received and a curling member that is engageable with the end of the bushing opposite the flange and is formed to curl this bushing end over the free end of the aforesaid rim. Where sealing devices are to be interposed between the bushing flanges and the container walls such sealing devices are formed with angular portions which are the parts of the sealing devices that are to be interposed between the bushing flanges and metallic container walls. I so arrange the guiding member that it is initially positioned to enable the adjacent portion of the sealing device to be initially engaged with the side of the bushing flange whereby the sealing device is positioned during the operation of the die mechanism to acquire the proper position with respect to the bushing after the die mechanism has completed its operation. The portions of the sealing devices that engage the edges of the bushing flanges conform in shape to such flanges. If the sealing devices are in the shape of tags they are of angular formation to conform to the corner portions of the flanges if such flanges be polygonal in contour. In order that the sealing devices may be accurately positioned with respect to the bushing flanges the gateway formation of the aforesaid guiding member is also formed to accurately guide the sealing devices into place.

I will explain my invention more fully by reference to the accompanying drawings in which Fig. 1 is a view in elevation, mainly in section, of the die mechanism of my invention as it is preferably constructed, and in open adjustment, the metallic container wall, the bushing which is to be applied to the container wall and two sealing devices being also illustrated; Fig. 2 is a view taken on line 2—2 of Fig. 1, but on a smaller scale; Fig. 3 is a view taken on line 3—3 of Fig. 1, but on a smaller scale; Fig. 4 is a view generally similar to Fig. 1, but showing the die mechanism after it has been operated; Fig. 5 is a perspective view showing parts that appear in the previous figures in separated relation; Fig. 6 is a perspective view showing the bushing and two sealing devices after they have been applied to a container wall with the die mechanism of my invention, this figure also showing a closure plug in readiness to be inserted within the bore of the bushing; and Fig. 7 is a sectional view on line 7—7 of Fig. 6 illustrating the bushing, the metallic container wall and the two sealing devices in assembled relation.

A portion 1 of the sheet metal container wall may be an end wall of an oil containing barrel. This wall is previously operated upon by another die mechanism, not forming a part of my present invention, to shape it as illustrated. The shaping of such end wall is inclusive of a conically tapering portion 2 which preferably extends into the interior of the barrel or container, an annular flat portion 3 which is in a plane parallel with and spaced apart from the plane in which main body of the container wall lies, a shoulder portion 4 projecting from the inner edge of the flat portion 3 and outwardly toward the body of the wall, another flat portion 5 parallel with the body of the container wall and the flat portion 3 thereof and a rim 6 which projects outwardly from the flat portion 5 and which surrounds an opening through which the contents of the barrel are passed.

The bushing which is assembled with the container wall is formed with a flange 7 which has a depth, measured along the axis of the bushing, which is substantially coextensive with the distance between the inner faces of the parts 3 and 5. In order that the bushing may be held from rotation edge portions of the bushing flange 7 and adjacent parts of the wall portion 4 are at differing distances from the axis of the bushing and are in engagement. In the preferred embodiment of the invention the bushing flange is polygonal in contour and the wall portion 4 is correspondingly shaped and is of a size to snugly engage the edge of the flange. The wall portion 5 constitutes, essentially, a seat for the flange 7, the flange being maintained upon its seat by curling the outer end 8 of the interiorly threaded body or tubular portion 9 of the bushing outwardly over the free or outer end of the rim 6. It is desirable to assemble a sealing device with the bushing flange and the metallic wall of the container to guard against the undetectable removal of the closure plug 10. I have shown two sealing devices, in the form of tags 11 and 12, these tags being assembled with the die mechanism of my invention though such mechanism is not to be limited to the assembly of such tags. The tags are provided with eye holes 13 through one of which the eye hole 14, in the ear 15 a sealing wire is to be passed, the ends of the wire being assembled by a soft metal slug which is pressed into place and which is suitably marked for identification, in accordance with common practice. In order to prevent the sealing devices from being bodily turned upon the axis of the bushing and thereby prevent the closure plug from being removed the sealing devices are formed with portions 16 that are to be located in the plane of the bushing flange and which are of angular formation conforming to corner portions of the flange and contiguous corner portions of the wall part 5. In order to prevent the withdrawal of the sealing devices they are formed with continuations 17 that are angular to the portions 16 and which are interposed between the inner flat face of the flange and the flat wall portion 5. The portion of the sealing devices which have the eye holes 13 may extend in any suitable direction, these portions extending parallel with the body of the container wall, as illustrated.

The die mechanism of my invention provides for the ready insertion, therein, of the bushing with the flange thereof in proper register with the wall portion 4. It also provides for the ready insertion, therein, of the sealing devices with their corner portions in proper register with the corner portions of the bushing flange and the wall portion 4.

The die mechanism illustrated is inclusive of an anvil member 19 upon which the flange 7 of a bushing is to be seated, a guiding member 20 within which the anvil member is disposed and which guiding member is formed with a lateral gateway 21 having side walls 22 spaced apart coextensively with two opposite sides of the bushing flange to insure the location of the flange upon the anvil member in a predetermined position, said gateway terminating in a polygonal formation 23, at its inner end, which defines a predetermined position for the bushing flange with respect to the anvil member, a finishing member 24 in which the substantially cylindrical or annular rim 6 formed upon and projecting angularly from the metallic sheet 1 is snugly received, and a curling member 25 that is engageable with the end of the bushing opposite the flange 7 and is formed to curl this bushing end over the free end of the aforesaid rim 6. The gateway formation 23 accurately positions the unflanged edge of the bushing in register with the annular curling pocket in the curling member 25. Where sealing devices are to be interposed between the bushing flanges and the container walls, I so arrange the guiding member 20 that it is initially positioned to enable the adjacent portion 17 of the sealing device to be initially engaged with the side of the bushing flange whereby the sealing device is positioned during the operation of the die mechanism to acquire the proper position with respect to the bushing after the die mechanism has completed its operation. In order that the sealing devices may be accurately positioned with respect to the bushing flanges the gateway formation of the first aforesaid guiding member is also formed with a depressed portion 26 to accurately guide one of the sealing devices into place, the positioner 20 having another gateway 29 for another sealing device. The finishing member 24 has a shoulder which surrounds the portion 4 of the metal container wall that conforms in shape to the bushing flange and which is in register with the inner end of the gateway formation 23 upon the guiding member 20. This finishing member completes the shaping of the contiguous portion of part 1 about the flange and compresses the gasket 7'. The guiding member 20 is desirably movable along the axis of the anvil and is spring pressed by springs 27 into its normal position. The finishing member is similarly movable along the axis of the curling member and is also spring pressed by springs 28 into its normal position, the two members 20 and 24 yielding, during the operation of the die mechanism, to permit the anvil member and curling member to perform their functions.

Changes may be made without departing from the invention.

Having thus described my invention, I claim:

1. Die mechanism for applying flanged bushings to metallic sheets having annular rims projecting therefrom that surround the bushings including an anvil member for engagement by the flanged end of the bushing; a curling member formed to curl the other end of the bushing about the free edge of the annular rim with which the bushing is to be assembled; and a guiding member contiguous to the anvil member and having a gateway thereon positioned and shaped to guide the bushing upon the anvil member and position it in register with the curling member, said gateway being also formed with a depressed portion to guide a sealing member into position to have a portion thereof clamped between the flange and the metallic sheet consequent upon the operation of the die mechanism.

2. Die mechanism for applying flanged bushings to metallic sheets having annular rims projecting therefrom that surround the bushings including an anvil member for engagement by the flanged end of the bushing; a curling member formed to curl the other end of the bushing about the free edge of the annular rim with which the bushing is to be assembled and a guiding member contiguous to the anvil member and having a gateway thereon positioned and shaped to guide the bushing upon the anvil member and position it in register with the curling member, said gateway being provided with portions at unequal distances from the axis of the curling member to have holding engagement with similarly positioned parts of the bushing flange to place this flange in register with a correspondingly shaped pocket in the metallic sheet that is to receive it.

3. Die mechanism for applying flanged bushings to metallic sheets having annular rims projecting therefrom that surround the bushings including an anvil member for engagement by the flanged end of the bushing; a curling member formed to curl the other end of the bushing about the free edge of the annular rim with which the bushing is to be assembled; and a guiding member contiguous to the anvil member and having a gateway thereon positioned and shaped to guide the bushing upon the anvil member and position it in register with the curling member, said gateway being provided with portions at unequal distances from the axis of the curling member to have holding engagement with similarly positioned parts of the bushing flange to place this flange in register with a correspondingly shaped pocket in the metallic sheet that is to receive it, said gateway being also formed with a depressed portion to guide a sealing member into position to have a portion thereof clamped between the flange and the metallic sheet consequent upon the operation of the die mechanism.

4. Die mechanism for applying flanged bushings to metallic sheets having annular rims projecting therefrom that surround the bushings including an anvil member for engagement by the flanged end of the bushing; a curling member formed to curl the other end of the bushing about the free edge of the annular rim with which the bushing is to be assembled; and a guiding member contiguous to the anvil member and having a gateway thereon shaped and positioned to guide a sealing member into position to have a portion thereof clamped between the flange and the metallic sheet consequent upon operation of the die mechanism.

5. The structure of claim 1 wherein a finishing member is supplied in conjunction with the curling member and is formed to receive the rim upon the metallic sheet, both the finishing and guiding members being spring pressed toward each other.

6. The structure of claim 2 wherein a finishing member is supplied in conjunction with the curling member and is formed to receive the rim upon the metallic sheet, both the finishing and guiding members being spring pressed toward each other.

7. The structure of claim 3 wherein a finishing member is supplied in conjunction with the curling member and is formed to receive the rim upon the metallic sheet, both the finishing and guiding members being spring pressed toward each other.

8. The structure of claim 4 wherein a finishing member is supplied in conjunction with the curling member and is formed to receive the rim upon the metallic sheet, both the finishing and guiding members being spring pressed toward each other.

9. Die mechanism for applying bushings to metallic sheets having annular rims projecting therefrom that surround the bushings including an anvil member for engagement by one end of the bushing; a curling member formed to curl the other end of the bushing about the free edge of the annular rim with which the bushing is to be assembled; and a guiding member contiguous to the anvil member and having a gateway thereon positioned and shaped to guide the bushing upon the anvil member and position it in register with the curling member, wherein a finishing member is supplied in conjunction with the curling member and is formed to receive the rim upon the metallic sheet, both the finishing and guiding members being spring pressed toward each other.

In witness whereof, I hereunto subscribe my name.

JOHN W. SHERA.